Jan. 6, 1942.     C. M. HATHAWAY     2,269,152
FOIL GAUGE
Filed July 9, 1938     2 Sheets-Sheet 1
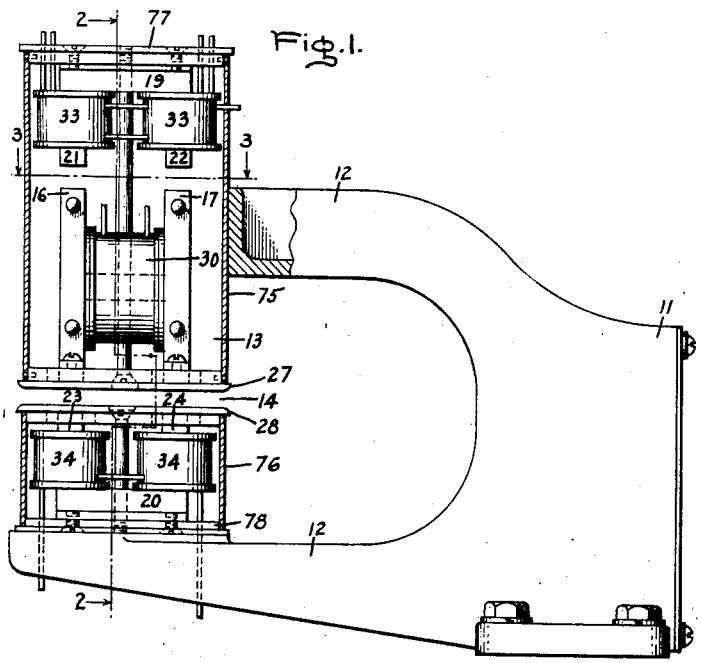
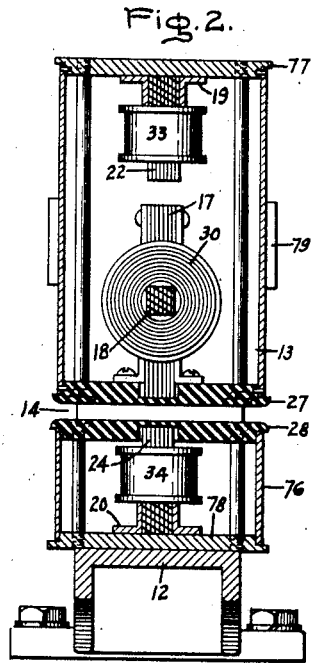
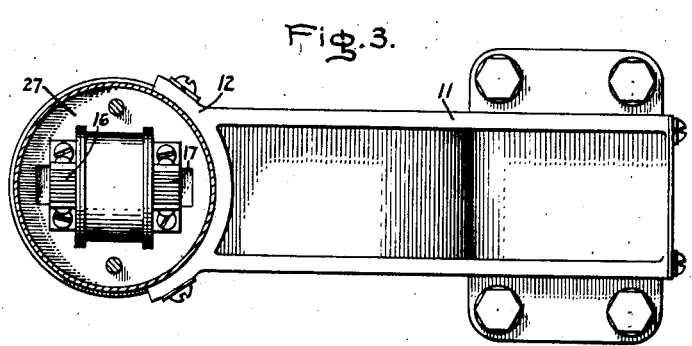
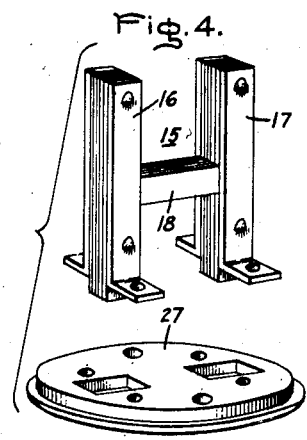
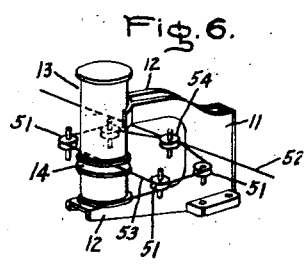
Inventor:
Claude M. Hathaway,
by Harry E. Dunham
His Attorney.

Jan. 6, 1942.  C. M. HATHAWAY  2,269,152
FOIL GAUGE
Filed July 9, 1938  2 Sheets-Sheet 2
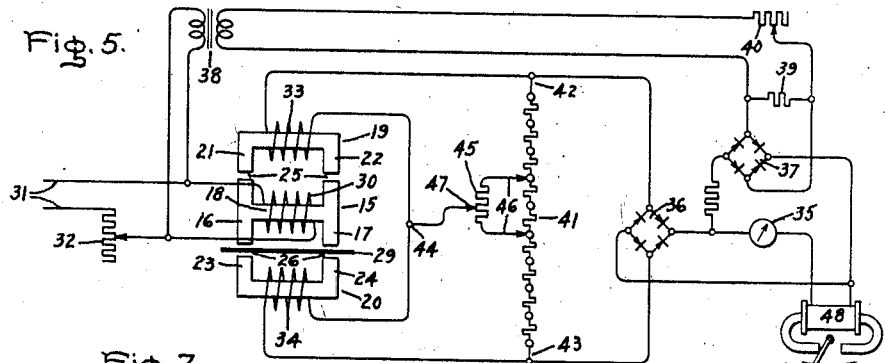
Inventor:
Claude M. Hathaway,
by Harry E. Dunham
His Attorney.

Patented Jan. 6, 1942

2,269,152

UNITED STATES PATENT OFFICE 2,269,152

FOIL GAUGE

Claude M. Hathaway, Niskayuna, N. Y., assignor to General Electric Company, a corporation of New York Application July 9, 1938, Serial No. 218,476

9 Claims. (Cl. 175—183)

This application is a continuation-in-part of my copending applications S. N. 126,624, filed February 19, 1937, and S. N. 198,337, filed March 26, 1938, both assigned to the same assignee as the present application.

My invention relates to electric gauges and concerns particularly thickness gauges for foil and metallic sheets.

It is an object of my invention to provide a simple, sturdy, reliable, compact, and easily operated thickness gauge which is adapted to measure thickness of foil or sheets continuously, if desired, at any speed, and which is unaffected by variations in position of the material being gauged.

It is a further object of my invention to provide apparatus which is adapted for gauging material varying widely in thickness, in which a relatively large gauging gap may be employed for easily accommodating the material to be gauged, and in which the measurement is relatively unaffected by variations in the size of the gap for receiving the material being gauged.

Still another object of my invention is to provide apparatus for automatically controlling the thickness of foil or sheet material during the process of manufacture.

It is also an object of my invention to provide gauging apparatus having zero and sensitivity adjustments with the zero adjustment independent of the sensitivity adjustment and independent of fluctuations in supply voltage.

Additional objects of my invention are the measurement of thickness of metallic wire and the measurement of conductivity or of purity of metallic sheets or wires of uniform thickness.

It is also an object of my invention to provide an improved form of gauges of the movable spindle type for measuring mechanical dimensions.

Other and further objects and advantages will become apparent as the description proceeds.

In carrying out my invention in its preferred form, I provide a pair of jaws carrying cooperating parts of an electric gauge having a gap through which the material to be gauged may be passed. The electric gauge includes a laminated magnetic core with windings in inductive relation to the core. The windings include an exciting winding energized by audio-frequency current and detecting windings which are responsive to the opposition presented to the passage of magnetic flux by material passing through the gap.

The invention may be understood more readily by referring to the following detailed description when considered in connection with the accompanying drawings. The features of my invention which are believed to be novel and patentable are pointed out in the claims appended hereto, or in the claims of my said copending applications. In the drawings, Fig. 1 is a side view, partially in section, of one embodiment of my invention; Fig. 2 is a sectional view cut by the plane 2—2 of Fig. 1; Fig. 3 is the top view of the apparatus of Figs. 1 and 2 showing a section but by the plane 3—3 of Fig. 1; Fig. 4 is a perspective view of one of the core elements and the face plate of the apparatus of Figs. 1 to 3; Fig. 5 is an electric circuit diagram illustrating schematically the apparatus of Figs. 1 to 4; Fig. 6 is a perspective view of the apparatus arranged for gauging wire; Fig. 7 is a diagram of an alternative electric circuit; Fig. 8 is a diagram representing a foil gauge employing the Wheatstone bridge principle; and Figs. 9 and 10 are diagrams of movable spindle dimension gauges employing the balanced transformer principle of Fig. 5. Like reference characters are utilized throughout the drawings to designate like parts.

Referring more in detail to the drawings, the apparatus of Figs. 1 to 7 consists of a fixture 11 having a pair of jaws 12 carrying an electric gauge head 13 with a gap 14 therein through which material to be gauged is passed. The electric gauge head 13 comprises a laminated field structure, windings carried thereon, a source of exciting current, and current-responsive apparatus for indicating gauge thickness or for adjusting the sheet-manufacturing apparatus. The field structure includes an H-shaped core element 15 with a pair of parallel legs 16 and 17 joined by a cross arm 18 and a pair of core elements 19 and 20. These core elements may be of U-shape with parallel legs 21 and 22 and 23 and 24, respectively. The legs 21 and 23 are in line with the legs 16 of the H-shaped core element 15. Likewise, the legs 22 and 24 are in line with the legs 17 of the H-shaped core element 15. The U-shaped elements 19 and 20 are spaced from the H-shaped element 15 to form two pairs of air gaps 25 and 26 between confronting ends of the legs of the elements of the field structure.

The pair of air gaps 26 is adapted to have the foil or other sheet material to be gauged pass through, and face plates 27 and 28 made of non-conducting, non-magnetic material are provided to cover the confronting ends of the core elements at the gap 26 for protecting the moving foil against injury as well as providing a protective enclosure for the parts of the gauge head.

The space between the face plates 27 and 28 forms the gap 14 within which the sheet material 29 is caused to travel. It will be understood that the direction of travel of the sheet 29 is perpendicular to the plane of the paper in the views of Figs. 1 and 5 and parallel to the plane of the paper in the view of Fig. 2, the sheet, itself, being perpendicular to the plane of the paper in either case.

The H-shaped core element 15 carries an exciting winding 30 on its connecting arm 18, and a source of alternating current 31 is connected to the exciting winding 30 preferably through a sensitivity-control rheostat or variable impedance 32. The alternating-current source 31 is preferably of audio frequency; i. e., below the radio frequency range; for example, it may be a two thousand cycle per second source. For relatively thick materials such as one-sixteenth inch brass, I have found sixty cycles to be satisfactory. The U-shaped core elements 19 and 20 carry the detecting windings 33 and 34, respectively, and a current-responsive device, such as a direct-current milliammeter 35, is indirectly connected to the windings 33 and 34 through a full wave rectifier 36, the connection being such that the windings 33 and 34 are in series opposition with respect to voltages induced by the exciting winding 30. The rectifier 36 may be of the copper oxide or other suitable type.

In order to operate the rectifier 36 in the range where it operates most efficiently and accurately as a rectifier the apparatus is arranged so that current flows in the rectifier 36 for a zero reading of the instrument 35. For this purpose, the instrument 35 may be made a suppressed zero instrument; but then a fluctuation in the supply voltage 31 results in shifting of the zero. In order to avoid the use of a suppressed zero instrument and to prevent zero shift regardless of voltage fluctuations, I supply an opposing current to the instrument 35, which fluctuates with the supply voltage. For example, a second full wave rectifier 37 may be provided with its input side energized by the source 31 and with the output side connected to the instrument 35 in shunt with the output side of the rectifier 36, but with polarity reversed with respect to the instrument 35. A transformer 38 is preferably provided for stepping down the input voltage of the rectifier 37 to a suitable value and a shunt resistor 39 may be connected across the secondary side of the transformer 38 to make the transformer loading and output voltage relatively independent of variations in instrument current. If desired, a rheostat 40 may be provided in the secondary circuit of the transformer 38 for adjusting the output current of the rectifier 37 to the best value and adjusting the instrument zero. My invention is not limited to specific numerical values but in the case of rectifiers of the output usually employed in connection with milliammeters, I have found two milliamperes to be a suitable value of current output for the rectifiers 36 and 37 when the instrument 35 reads zero.

The apparatus may be arranged either as a null device or as a direct indicating device. In either case means are provided for balancing the electrical circuit when a sheet of some thickness, assumed to be a standard thickness, is passed through the gap 14. Balance is obtained by providing a resistor 41 having ends 42 and 43 connected to the output ends of the winding 33 and 34 and an adjustable tap connected to the common terminal 44 of the windings 33 and 34. For providing both fine and coarse adjustment, an intermediate potentiometer 45 may be provided having end terminals connected to a pair of coarse-adjustment taps 46 movable as a unit along the resistor 41 and having a fine-adjustment tap 47 connected to the common terminal 44 of the windings 33 and 34. Preferably, the resistor 41 is provided with contacts spaced to conform to the spacing between the taps 46, e. g. with half the spacing so that the coarse-adjustment taps 46 always bridge two sections of the resistor 41.

The invention is not limited to the use of indicating instruments and includes also the use of any current-responsive device, such as telemetering or recording devices or the use of relays for operating a suitable thickness-controlling apparatus not shown. For example, a directional or polarized relay 48 may be connected in series with the instrument 35 and may be provided with left and right contacts 49 and 50, respectively, for energizing suitable controls to increase or decrease the thickness of the sheet being produced. The apparatus for forming or rolling the sheets and the controls therefor do not form a part of my invention, and, consequently, are not illustrated in the drawings.

In order to protect the parts of the electric gauge 13 against dirt, against magnetic dust, and against particles of electrically-conducting material, the parts are preferably enclosed by cylindrical cases 75 and 76 closed at the ends by a plate 77 supporting the U-shaped core element 19, by the face plates 27 and 28, and by a base plate 78 resting upon the lower jaw 12 and supporting the lower U-shaped core element 20. The H-shaped core element 15 is supported by the face plate 27 secured to the cylindrical case 75 and the case 75 is in turn secured to the upper jaw 12 of the fixture 11 by a band 79.

The use of audio-frequency as distinguished from high frequency current for energizing the apparatus results in magnetic flux capable of penetrating the foil 29 and makes the readings relatively independent of the surface characteristics of the foil and responsive only to its thickness. The use of audio-frequency current also makes it unnecessary to provide a vacuum-tube high-frequency generator and together with the use of iron core elements makes it possible to obtain sufficient response for the operation of ordinary instruments and relays without the interposition of amplifiers. Furthermore, the design results in a particularly rugged construction.

It will be understood that, in the operation of the apparatus, the sheet 29 of material being gauged, which may be in the form of a ribbon, in most cases of non-magnetic metal, is passed from the rolls by which it is reduced to final size or from a reel on which it may be stored through the gap 14 on to a reel upon which it is rerolled. Since the sheet 29 is composed of electrically-conducting material, it opposes the passage of flux across the pair of air gaps 26 and the strength of the opposition to flux depends upon the thickness of the material 29. The windings 30 and 34 form the primary and secondary windings, respectively, of a transformer of which the transformer ratio is varied by the opposition to flux passage produced by the sheet 29. The detecting winding 33 also forms a second secondary winding of the transformer and a variation in the opposition to flux produced by the sheet 29 varies the relative magnitudes of the voltages induced in the windings 33 and 34. Since the windings 33 and 34 are oppositely connected to the portions of the resistor 41 above and below the tap 47, the input to the rectified depends upon the difference between the voltage drops in the portions of the resistor 41 above and below the tap 47, and this difference depends upon variations in foil thickness and the setting of the taps 47 and 46. If the apparatus is balanced to give a zero reading for a given standard foil thickness by placing a foil of standard thickness in the gap 26 and adjusting the taps 46 and 47 until the instrument 35 reads zero, the instrument will thereafter read in terms of deviation from standard thickness. Variations in voltage of the supply source 31 will not affect the zero setting because the equal current outputs of the rectifiers 36 and 37 will be affected in the same proportion. Voltage fluctuations will, however, affect the sensitivity. In order to check the sensitivity, after the zero has been checked, a foil of known deviation from standard is placed in the gap 26 and the rheostat 32 is adjusted until the correct reading is given by the instrument 35. For reasons already explained adjustment of the rheostat 32 will not disturb the zero adjustment.

In case of application of my invention in an automatic foil rolling mill, deviations from the desired thickness of foil will vary the opposition to flux crossing the pair of air gaps 26, varying the voltage induced in the windings 34 and un- balancing the voltages appearing in the secondary windings, thereby producing a reading in the instrument 35 and operating the relay 48 in whichever direction is required to correct the adjustment of the mill. If desired, of course, the taps 46 and 47 may be so set as to produce a zero deflection of the instrument 35 when no sheet is present in the gaps 26 and the instrument 35 may then be calibrated in terms of the thickness of sheet passed through the gaps 26. In this case, a contact-making milliammeter will be substituted for the directional relay 48 and it will be adjusted to operate at the current corresponding to the desired sheet thickness.

Although I have explained the operation of my apparatus in connection with thickness gauging of sheets, it will be understood that my invention is not limited thereto and that the apparatus may also be used for gauging wire passed through the gap in closed loops, or for measuring or gauging conductivity or purity of sheets or wires of conducting material known to be of uniform thickness.

Wire may also be gauged or tested continuously. For example, as illustrated in Fig. 6, non-magnetic guide rollers or sheaves 51 may be provided for holding a wire 52 in the form of a loop with a portion 53 passing through the air gap 14 between the legs 16 and 17 of the magnetic core element 15. An additional roller or sheave 54 is provided which is composed of material which is non-magnetic but which serves as a good conductor of electricity, such as copper. Consequently, an electrically-closed loop of wire is formed, notwithstanding the fact that the wire may travel around the rollers continuously as the wire is passed through the testing apparatus. It will be understood that suitable arrangements are to be provided for keeping the wire 52 taut and maintaining a good contact at the roller 54. Obviously, the loop of wire 52 reacts upon the magnetic field of the apparatus and thus permits readings to be obtained of the thickness or purity of the wire, as previously explained, as well as permitting indications of flaws, such as cracks or transverse cuts.

An alternative electrical circuit arrangement may be used as illustrated in Fig. 7. Here the windings 33 and 34 are connected aiding instead of in opposition, and the input terminals of the rectifier 36 are connected between the tap 47 and the common terminal 44 of the windings 33 and 34. The windings 33 and 34 thus form two arms of a bridge with the upper and lower portions 55 and 56 of the resistor 41 forming two opposite arms. The circuit is balanced as before by adjusting the positions of the coarse and fine adjustment taps 46 and 47. It is apparent that both in Fig. 5 and in Fig. 7, the windings 33 and 34 are connected in differential or opposed relationship to the rectifier 36 and the instrument 35 and in both cases a double-mesh circuit arrangement is produced.

If desired, bridge circuits similar to those of my said copending application, Serial No. 198,337, may be used for foil gauging. An example is illustrated in Fig. 8. A bridge is formed by two reactors 57 and 58 and two portions 59 and 60 of an impedance 61 connected in series parallel to the alternating-current source 31. The reactor 57 has air gaps 26 through which the foil to be gauged may pass. The impedance 61 may be provided with an adjustable tap 62 for varying the relative impedances of the arms 59 and 60 of the bridge for balancing purposes or a rheostat 63 shunting one of the reactances 57 or 58 may be provided. The input terminals of the rectifier 36 are connected between the tap 62 and a point 64 forming the common terminal of the reactances 57 and 58. Variations in foil thickness will cause variations in the degree of unbalance of the bridge consisting of arms 57, 58, 59 and 60 and the instrument 35 may be calibrated in terms of foil thickness.

If the transformer primary 30 and its core 15 of Fig. 5 are made movable and connected to the movable spindle of a dimension gauge such as that disclosed in my said copending application 198,337, the differential output of the transformer secondaries 33 and 34 will represent deviations from a standard dimension. The secondaries may be connected either in parallel opposition as in Fig. 7, or in series opposition as in Figs. 5 or 9. In Fig. 9 is shown the movable spindle 65 of a dimension gauge having an anvil 66 upon which an object 67 to be gauged may be placed so that the thickness of the object 67 is measured by determining the position of the spindle 65. The spindle 65 carries a transformer core 68 upon which the primary coil 30 is wound. The tip 69 of the core 68 is positioned between the ends of the cores 19 and 20 of the secondary windings 33 and 34, which, in this embodiment, are directly connected in series opposition to the input side of the rectifier 36. The cores 19 and 20 are supported in a suitable manner by the stationary part of the apparatus (not shown). Preferably the spindle 65 is resiliently mounted as by means of leaf springs 70 supported by stationary blocks 71. The spindle 65, springs 70 and blocks 71 are composed of magnetizable material to form two parallel branch magnetic circuits for the flux induced by the primary winding 30. The relative magnitudes of the air gaps 25 and 26 of the transformer ratios, and of the voltages of windings 33 and 34, depend upon the position of the spindle 65. Accordingly, the reading of the instrument 35 depends upon the thickness of the test object or piece 67. Preferably the apparatus is so adjusted as to be always unbalanced in a given direction since the rectifier 36 makes the instrument 35 unresponsive to reversal in direction of unbalance.

In Fig. 10 a modified dimension gauge is shown in which a pair of primary windings 72 and 73 are wound upon the stationary cores 19 and 20 and a secondary winding 74 is wound upon the movable core 68. The windings 72 and 73 are connected in series and so wound as to pass flux in the same direction through the cores 19 and 20. The secondary winding 74 is connected to the input side of the rectifier 36. When the core 68 is centered between the cores 19 and 20 there will be no tendency for flux to flow through the core 68, but when the core 68 departs from this position the magnetic circuits will become unbalanced causing flux to flow through the core 68 and a voltage to be induced in the secondary winding 74. In this case the differential action takes place in the magnetic circuit instead of in the electrical circuit as in the previously illustrated embodiments.

I have herein shown and particularly described certain embodiments of my invention and certain methods of operation embraced therein for the purpose of explaining its principle and showing its application, but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A gauge comprising a pair of current-conducting elements, means for producing alternating potential difference in said elements, means for producing variations in the relative values of the potential differences in response to variations in a quantity to be measured, a rectifier having a pair of input terminals and a pair of output terminals, said current-conducting elements being connected in differential relationship to said input terminals, a direct-current-responsive device connected to said output terminals, and means for supplying a direct voltage to said current-responsive device of opposite polarity to that supplied by the output terminals of said rectifier and of sufficient magnitude to maintain the current in the rectifier sufficiently high for accurate operation as a rectifier.

2. A foil thickness gauge comprising in combination a magnetic core element with branches forming parallel magnetic circuits, an exciting winding in inductive relation to both of said magnetic core branches, at least one of said magnetic core branches including an air gap adapted for passage of foil to be gauged, an impedance element having an adjustable tap, a detecting winding linking one of said core branches, a second detecting winding linking the other of said core branches, said detecting windings being connected in series opposition across said impedance element with a common terminal connected to said tap, a rectifier having input terminals connected across said impedance element and having output terminals, a second rectifier having input and output terminals, means for maintaining proportionality of voltage across said latter input terminals and the said exciting winding, and a direct-current-responsive device to which said rectifier output terminals are connected in opposed relation.

3. A foil thickness gauge comprising in combination a magnetic core element with branches forming parallel magnetic circuits, an exciting winding in inductive relation to both of said magnetic core branches, at least one of said magnetic core branches including an air gap adapted for passage of foil to be gauged, a resistor having an adjustable tap, a detecting winding linking one of said core branches, a second detecting winding linking the other of said core branches, said detecting windings being connected in series opposition across said resistor with a common terminal connected to said tap, a rectifier having input terminals connected across said resistor and having output terminals, a direct-current-responsive device connected to said output terminals, and means for supplying to said direct-current-responsive device a current having a polarity opposite to that supplied by the output terminals of the rectifier.

4. A gauge comprising a pair of magnetic circuits with detecting windings in inductive relation thereto, and input and output electric circuit connections, means for varying the relative reluctances of the magnetic circuits in response to variations in a quantity to be measured, said magnetic circuits being in differential relationship to the windings with respect to the output electric connections, a rectifier having a pair of input terminals connected to said output electrical connections and having a pair of output terminals, a direct-current-responsive device connected to said rectifier output terminals and means for supplying a direct voltage of opposite polarity to that supplied to the output terminals of said rectifier and of sufficient magnitude to maintain the current in the rectifier sufficiently high for accurate operation as a rectifier.

5. A foil thickness gauge comprising in combination a magnetic core element with branches forming parallel magnetic circuits, an exciting winding in inductive relation to both of said magnetic core branches, at least one of said magnetic core branches including an air gap adapted for passage of foil to be gauged, a current-carrying impedance element having an adjustable tap, a detecting winding linking one of said core branches, a second detecting winding linking the other of said core branches, said detecting windings being connected in series aiding across said impedance element, a rectifier having input terminals connected to the common terminal of said detecting windings and said tap respectively, and having output terminals, a direct-current-responsive instrument connected to said output terminals, and means for supplying direct voltage to said current-responsive instrument of opposite polarity to that supplied to said output terminals of said rectifier.

6. A gauge comprising a pair of current-conducting elements, means for producing alternating potential difference in said elements, means for producing variations in the relative values of the potential differences in response to variations in a quantity to be measured, a rectifier having a pair of input terminals and a pair of output terminals, means supplying current to said input terminals dependent in magnitude upon the relative values of said potential differences, a direct-current-responsive device connected to said output terminals, and means for supplying a direct voltage to said current-responsive device of opposite polarity to that supplied by the output terminals of said rectifier and of sufficient magnitude to maintain the current in the rectifier sufficiently high for accurate operation as a rectifier.

7. A foil thickness gauge comprising in combination a reactor having a core with an air gap adapted for passage of foil to be gauged, a current-carrying impedance element in series with said reactor, a pair of impedances connected in series, a rectifier having a pair of input terminals, one of which is connected to the common point of said reactor and said current-carrying impedance element, and the other of which is connected to the common point of said pair of impedances, a pair of terminals to which the series connected elements are connected to form a Wheatstone bridge circuit, a current responsive instrument connected to the output terminals of said rectifier, a second rectifier having input and output terminals, the output terminals being connected to the output terminals of the first rectifier but with reverse polarity, means for maintaining proportionality of potential difference between the input terminals of said Wheatstone bridge and the input terminals of said second rectifier.

8. A foil thickness gauge comprising in combination a reactance element having a core with an air gap adapted for passage of foil to be gauged, and three impedance elements, the foregoing four elements being connected in series parallel to form the side arms of a Wheatstone bridge, a current-responsive device, a rectifier having a pair of output terminals connected to the current responsive device and having a pair of input terminals connected in cross circuit with respect to said elements, whereby the rectifier forms the diagonal arm of a Wheatstone bridge circuit, and a source for supplying a direct voltage to said current responsive device of opposite polarity to that supplied by the output terminals of said rectifier and of sufficient magnitude to maintain the current in the rectifier sufficiently high for accurate operation as a rectifier.

9. A foil thickness gauge comprising in combination a magnetic core element with branches forming parallel magnetic circuits, an exciting winding in inductive relation to both of said magnetic core branches, at least one of said magnetic core branches including an air gap adapted for passage of foil to be gauged, a resistor having an adjustable tap, a detecting winding linking one of said core branches, a second detecting winding linking the other of said core branches, said detecting windings being connected across said resistor and having a common terminal, a rectifier having input terminals and output terminals, connections between the common terminal of said detecting windings and an intermediate point on said resistor to form two mesh circuits, the input terminals of said rectifier being connected in differential relationship to said mesh circuits, a direct current responsive device connected to said output terminals, and means for supplying to said direct current responsive device a current having a polarity opposite to that supplied by the output terminals of the rectifier and of sufficient magnitude to maintain the current in the rectifier sufficiently high for accurate operation as a rectifier.

CLAUDE M. HATHAWAY.